Dec. 31, 1963 R. H. OLSON 3,116,138
MOLTEN GLASS CONDITIONING APPARATUS
Filed April 4, 1960 3 Sheets-Sheet 1
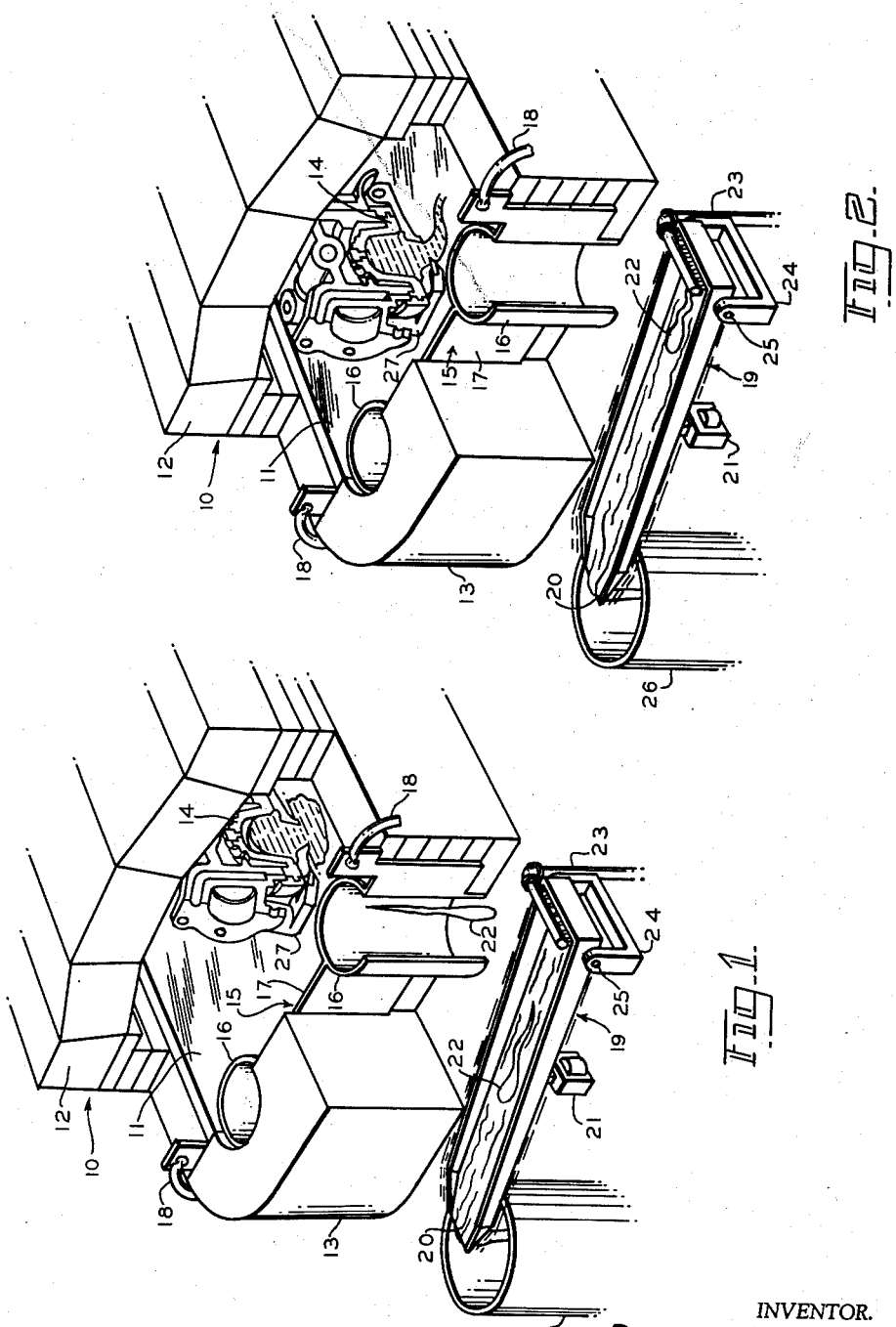
INVENTOR.
RALPH H. OLSON
BY
ATTORNEYS Dec. 31, 1963   R. H. OLSON   3,116,138
MOLTEN GLASS CONDITIONING APPARATUS
Filed April 4, 1960   3 Sheets-Sheet 2
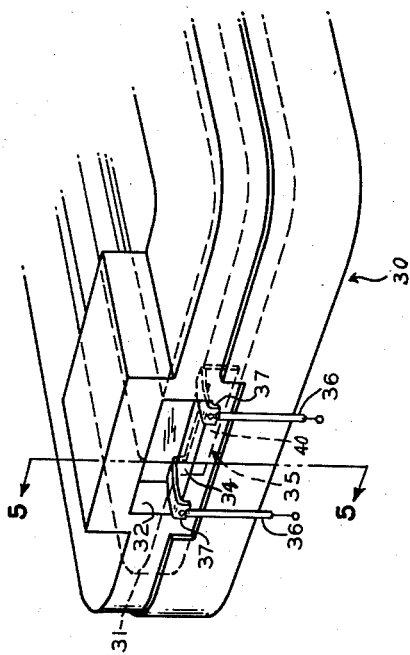
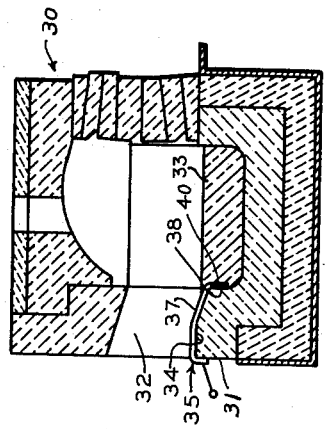
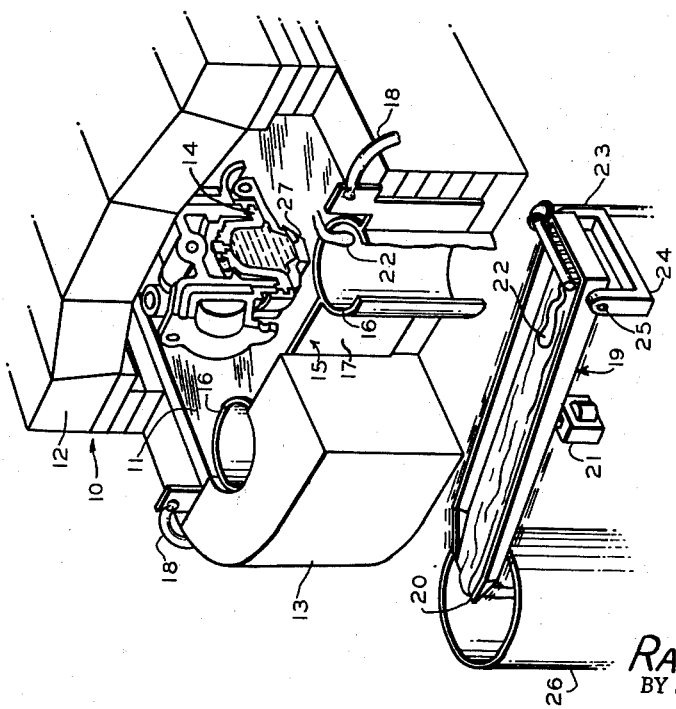
INVENTOR.
RALPH H. OLSON
BY
ATTORNEYS Dec. 31, 1963 R. H. OLSON 3,116,138
MOLTEN GLASS CONDITIONING APPARATUS
Filed April 4, 1960 3 Sheets-Sheet 3

INVENTOR.
RALPH H. OLSON
BY
ATTORNEYS 3,116,138
MOLTEN GLASS CONDITIONING APPARATUS
Ralph H. Olsen, Toledo, Ohio, assignor to Owens-Illinois Glass Company, a corporation of Ohio
Filed Apr. 4, 1960, Ser. No. 19,646
7 Claims. (Cl. 65—165)

This invention relates to an apparatus for stabilizing the temperature of molten glass at the forward end of a molten glass containing channel wherein the mold charges are taken from the forward end by a ram-type gathering mold. More particularly, this invention relates to the provision of an electric heater positioned within the glass at the forward end of the channel so as to heat the glass to compensate for the loss of heat normally experienced in the gathering chamber or open forward end of the channel.

In presently existing forehearths or forebays of the type that are adapted to carry molten glass to a position where a ram-type gathering mold extends over the glass and glass is drawn into the mold by the application of a vacuum to the mold, it is necessary that the gathering chamber of the forehearth or forebay be open to the atmosphere to provide an entrance for the gathering mold thus resulting in the molten glass in this open area becoming chilled with respect to the glass in the enclosed portion of the forebay or forehearth. When the gathering mold, during its normal operating cycle, has been fully charged, a severing means severs the excess glass from the bottom of the gathering mold and this excess glass, commonly called a "tail," will fall back into the main stream of molten glass. When this "tail" falls back to the main body of molten glass it frequently will entrap air in the form of bubbles which are termed "blisters." These "blisters," if they are picked up in successive mold charges will appear as defects in the finally formed ware, and it is desirable that these tails be prevented from contaminating successively formed mold charges. Furthermore, it is apparent that the glass adjacent to the opening or entrance in the forehearth or forebay will be cooler and the temperature gradient through the glass in the gathering chamber will be more pronounced in the center of the opening or entrance due to surface radiation and conduction through the forward end of the channel.

It is an object of this invention to provide heating means at the forward end of the glass channel which is effective to heat the glass across the full width of the forehearth or forebay opening.

It is an additional object of this invention to provide an electrical resistance heating element which extends below the surface of the molten glass and extends the full width of the channel opening.

It is a further object of this invention to provide an electric resistance type heating element whose dimensions are such that its resistance varies throughout its length.

It is a still further object to provide a structural arrangement whereby the severed tails are segregated from the main stream of glass and are discarded.

Other objects and advantages of this invention will be apparent from the following detailed description of two embodiments of the invention.

In the accompanying drawings:

FIG. 1 is a schematic isometric view of a glass channel and heater of the invention with a mold ram in gathering position;

FIG. 2 is a view similar to FIG. 1 showing the mold ram partially retracted and the mold charge partially severed from the main body of molten glass;

FIG. 3 is a view similar to FIGS. 1 and 2 showing the mold charge completely severed from the main body of glass and the resulting tail being segregated from the glass in the channel and discarded;

FIG. 4 is a schematic isometric view of a second embodiment of the invention showing a circulating forehearth employing a channel heater;

FIG. 5 is an elevational, cross-sectional view taken through the gathering chamber of FIG. 4 at line 5—5;

Figure 6:
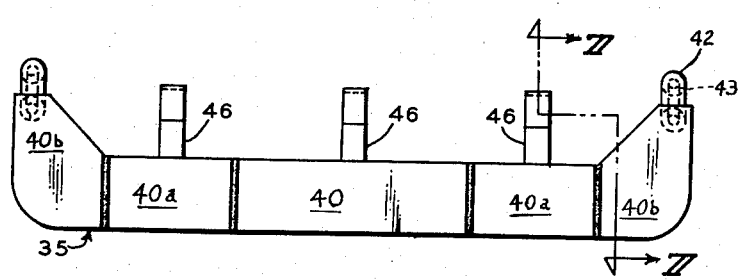
FIG. 6 is an elevational detailed view on an enlarged scale of the heater element of FIG. 4.

Referring now to FIGS. 1 to 3, there is shown a channel 10 containing molten glass 11, the channel 10 extends out from a melting furnace (not shown) and has a cover 12 that overlies and extends throughout substantially its full length. The channel 10 has a forward end 13, remote from the end connected to a furnace or glass melter, that has an opening forward of the cover 12 to provide an entrance for a gathering ram 14. The gathering ram or mold 14 is mounted for angular movement into the open end of the channel. The mechanism for manipulating the gathering mold 14, while not shown, is essentially the same as that disclosed in U.S. Patent No. 2,150,637, issued March 14, 1939, to H. R. Schutz. As disclosed in said patent, the gathering mold 14 is adapted to be inserted through an opening in the furnace at an angle so that it contacts the glass surface at which time a vacuum is applied to the mold to draw the glass into the mold. When the mold is charged, it is moved horizontally in a retracting direction, then lifted and withdrawn from the glass surface. Extending across the width of the channel 10 at the entrance or forward end 13 is a platinum heater element 15. The heater element 15 has two cylindrical portions 16 connected together by straight portion 17 and is provided with electrical leads 18 connected to opposite ends thereof. A suitable source of electric power, not shown, is connected across the leads 18.

A conveyor, generally indicated as 19, extends parallel to the heater element 15 and is positioned below and in alignment with the cylindrical portion 16 of the heater element 15. The conveyor 19 is in the form of an elongated shallow pan having one end 20 open and slightly lower than the opposite end. It is vibrated by a motor 21 connected to the underside thereof. In order to facilitate the discharge of severed tails 22 the conveyor 19 is continuously supplied with a flow of water through a supply pipe 23. The supply pipe 23 extends over one end of the conveyor 19 and small openings in the bottom of the supply pipe 23 distribute the water the full width of the conveyor 19. The conveyor 19 is supported at its non-open end by a supporting yoke 24 and pins 25, which allow pivotal movement of the conveying means 19 about the axis of the pins 25. The open or discharge end 20 of the conveying means 19 overlies a vertical disposal or cullet chute 26 into which the water and tails 22 are discharged.

FIGS. 1 to 3 illustrate the sequence of operation of the gathering mold and its severing means 27 with respect to the cylindrical portion 16 of the heater element 15.

FIG. 1 illustrates the position of the gathering mold 14 at the time the glass is being drawn into the mold. FIG. 2 illustrates the position of the gathering mold 14 after it has been fully loaded and is being withdrawn from the channel 10. As can be seen from this figure, the severing means 27 is moving across the bottom of the mold to sever the excess glass therefrom. This excess glass as it is lifted from the surface of the glass 11, due to the viscosity and cohesiveness of the glass, will form a tail which necessarily becomes chilled.

FIG. 3 illustrates the interval in the operating cycle of the gathering mold 14 when the severing means 27 has completely cut the tail from the gathering mold charge and this severing takes place when the gathering mold is above and in alignment with the axis of the cylindrical portion 16 of the resistance heater element 15. Therefore, the tail will fall vertically into the center of the cylindrical portion 16 of the resistance heater 15. Due to the fact that the tail is still connected to the main body of molten glass, it will not fall freely through the cylindrical member 16 but will drape itself over the edge of the member. The principal mass of the tail will be subjected to gravitational forces, and therefore will become detached from the main stream and fall to the conveying means 19 and be delivered to the cullet chute 26. Thus, it can be seen that the "blisters" forming tail 22 is removed from the main body of molten glass and there is no possibility that it would be included in the mold charges successively formed.

While FIGS. 1 to 3 illustrate a single gathering ram or mold, it should be pointed out that in actual practice there are two gathering molds that are operated simultaneously, thus, the reason for having two cylindrical portions 16 in the resistance heater 15. Furthermore, by providing the heater element extending across the forward end of the channel 10, it is possible to heat the glass at the zone most subject to thermal instability. Obviously, the glass will become cooler at the forward end 13 due to heat being conducted through the forward wall of the forebay or channel 10. In view of the fact that the cover 12 cannot extend over the glass 11 at this forward end, additional heat is lost in radiation to the atmosphere. It is further apparent that the glass will be cooler at the center of the forward end than at the sides thereof and for this reason the heater is constructed so that its central portion 17 is of thinner cross-section than the ends thereof thus providing greater electrical resistance and greater heat output at the center of its span.

While the above description has been principally directed to a static glass channel in the sense that the glass is not flowing except to replenish what is removed by the gathering molds, it should be pointed out that the glass could be continuously flowing in the channel by utilizing the heater element 15 as an overflow dam. If it is necessary to continuously drain a controlled amount of glass in order to keep the surface clear of cut off blisters and of contamination, this can be achieved by simply raising the operating level of the glass at the furnace and adjusting the height of the gathering ram or mold accordingly.

Referring to FIGS. 4 to 7, there is shown a second embodiment of the invention as applied to a circulating forehearth 30. Referring specifically to FIGS. 4 and 5, a circulating forehearth 30 has a channel 31 therein. The forehearth 30 extends out from a melting furnace (not shown) a substantial distance and is generally U-shaped in plan view with the ends of the U communicating with the melting furnace. In this type of forehearth the glass is continuously moving in one direction in the channel 31 and at the forward end of the channel there is an opening 32 provided in the wall of the forehearth above the level of the glass 33 flowing therethrough. The gathering mold or ram is inserted through the opening 32. The upper edge 34 of the channel 31 at the opening 32 forms the supporting surface for a heating element 35 having power input leads 36 and current conducting elements 37 embracing the channel edge at 34. The main portion of the heater element 35 extends below the level of the glass 33 and extends the full width of the opening 32.

The circulating forehearth is principally constructed of fire brick having good thermal insulating properties. The channel 31, however, is formed of a refractory material which is a relatively good heat conductor. Due to the fact that the outer surface of the channel 31 is exposed to the atmosphere beneath the opening 32 the temperature of the glass 33, in contact with the wall 38 of the channel 31, will be lower than the temperature of the glass which is more remote from the opening 32. This existing temperature gradient results in a lack of uniformity of temperature of the mold charges which is a highly undesirable condition. In order to alleviate this non-uniform glass temperature condition existing at the opening 32, the heater 35 is located so that its principal heating surface overlies the wall 38 of the channel 31.

Figure 7:
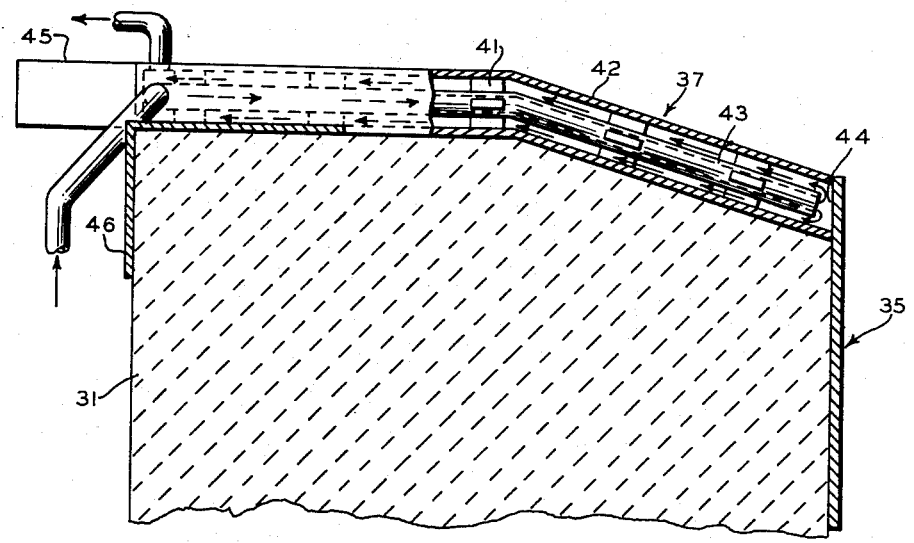
FIG. 7 is a cross-sectional view of the heater element taken on the line 7—7 of FIG. 6.

Referring now to FIGS. 6 and 7 there is shown in detail the specific construction of the heater element 35. The glass contacting portion of the element 35 is formed of several strips of platinum welded together in series. Due to the fact that the zone of greatest cooling will appear midway between the sides of the opening 32, the heater element 35 is formed with a relatively thin platinum strip at its central portion 40. Slightly thicker platinum strips 40a are welded at opposite ends of this central portion 40 and at the ends of the intermediate strips 40a, even thicker platinum strips 40b are welded. For example, the extreme end portions 40b can be of a thickness in the order of .125", the central portion 40 having a thickness of .060", whereas the intermediate sections 40a will have a thickness of .080". Thus, the heater element will have the greatest heat output at the central portion 40 and the least output at the ends 40b. This is advantageous in that a uniform temperature will be obtained in the glass 33 adjacent to the opening 32 in the channel 31.

The electrical current conducting elements 37 connected to the heater strips 40, 40a and 40b are cooled by circulating a suitable coolant therethrough. The elements 37 take the form of two concentric tubes 42 and 43 held in spaced relationship by means of members 41. (See FIG. 7.) The inner tube 42 is connected to a suitable source of coolant and conveys the coolant in the direction of the arrows to an end 44 of the element 37 adjacent the point of attachment to the heater element 35. The water than returns in surrounding relationship with respect to the tube 43 but inside the tube 42 to the remote end of the element where it is discharged. The desirability of cooling the element 37 is obvious from the fact that glass temperatures in the circulating forehearth are in the order of 2000° F. Furthermore, the support 37 is also the electrical connection to the strip heater 35.

The electrical connection to the support element 37 is made at a tab-like element 45 joined to the end of the support element.

To insure that the heater element 35 is adequately supported on the channel 31, three additional supporting elements 46 are fastened to the top edge of the heater and extend over the wall 34 and grip the outside face of the channel 31. (See FIG. 7.)

In summary, it can be seen that the utilization of a heater having a variable heat output throughout its length is advantageous in that it will stabilize the temperature of the molten glass at the location where the glass is most susceptible or subject to cooling. Thus, by properly selecting the amount of power supplied to the resistance heater element, the temperature of the glass adjacent to the opening or gathering chamber in a circulating forehearth or a relatively static forebay may be made constant and predetermined thus insuring better temperature control of the mold charges and preventing formation of "blisters" within the mold charges.

Various modifications may be resorted to within the spirit and scope of the appended claims.

I claim:

1. Apparatus for controlling the glass temperature in a forehearth entrance comprising an elongated horizontal channel within said forehearth adapted to accommodate molten glass therein, said channel being open to the atmosphere at the forehearth entrance-end above the glass level therein, a pair of electrically conductive leads, said leads being connected to an electrically conductive heating element extending across and closing the forward end of said channel, said heating element having its upper edge above the glass level and its lower edge extending below the full depth of said channel, said heating element further comprising at least two opposed wall sections defining a vertical, open-ended, passageway extending from above the glass level and through the bottom of the forehearth, and means for gathering charges of glass from said channel and depositing the severed excess glass tails in the area between said opposed heater wall sections whereby the tails fall by gravity through said passageway and out of the forehearth.

2. Apparatus as defined in claim 1, further including conveyor means mounted below and in alignment with said vertical passageway for conveying said severed tails away from said forehearth, and a disposal chute mounted to receive the tails from said conveyor.

3. The apparatus as defined in claim 2 wherein said conveyor means comprises an elongated, shallow pan having one end maintained higher than the other end, means connected to said pan for vibrating said pan vertically, and means for supplying a continuous flow of water to the high end of said pan whereby tails deposited on said pan will be conveyed to the disposal chute.

4. In apparatus for conditioning molten glass in a forehearth entrance wherein mold charges are gathered by a gathering ram from an exposed surface of the glass and separated from said surface while being moved at an angle out of the forehearth entrance, comprising an electrically conductive heating element extending across the forward end of said forehearth and extending the full depth thereof, a pair of electrically conductive leads connected to said heating element, said heating element further comprising at least two opposed wall sections defining a vertical passageway through the bottom of said forehearth, and means connected to said ram for severing the chilled tail portion of glass from the mold charges when the ram is over the heated vertical open-ended passageway, whereby the tails are discarded.

5. The apparatus as defined in claim 4 further including conveyor means mounted below and in alignment with said vertical passageway for conveying the severed tail portions away from said forehearth.

6. The apparatus as defined in claim 4 wherein said heater element comprises a pair of vertically disposed metallic plates joined to diametrically opposed side walls of a hollow metallic cylinder.

7. An apparatus for conditioning molten glass in a forehearth channel entrance wherein mold charges are gathered by a ram from the exposed surface of the molten glass and separated from the surface while being moved at an angle from the forehearth entrance, the combination comprising an electrically conductive heating element extending across and closing the forward end of said channel, a pair of electrically conductive leads connected to said heating element, said heating element defining the forward wall of said channel and having its upper edge above the glass level with its lower edge extending at least the full depth of said forehearth, said heating element further comprising at least two vertically positioned co-planar metallic wall sections, a hollow, cylindrical, metallic member positioned between and joined to said wall sections with its axis parallel to said vertical plane, an elongated, shallow pan mounted beneath and in alignment with the axis of said cylindrical member with one end of said pan maintained higher than the other end, means connected to said pan for vibrating said pan vertically, and means for supplying a continuous flow of water to the high end of said pan.

References Cited in the file of this patent

UNITED STATES PATENTS

| | | |
|---|---|---|
| 1,328,273 | Ferngren | Jan. 20, 1920 |
| 1,771,904 | Soubier | July 29, 1930 |
| 2,179,224 | Soubier | Nov. 7, 1939 |